United States Patent [19]

Taborn et al.

[11] Patent Number: 5,668,984
[45] Date of Patent: Sep. 16, 1997

[54] VARIABLE STAGE LOAD PATH AND METHOD OF OPERATION

[75] Inventors: Michael Preston Taborn; Roger Ned Bailey; Steven Michael Burchfiel, all of Austin, Tex.

[73] Assignee: International Business Machines Corporation, Armonk, N.Y.

[21] Appl. No.: 394,868

[22] Filed: Feb. 27, 1995

[51] Int. Cl.[6] .............................. G06F 9/302; G06F 7/38
[52] U.S. Cl. ................. 395/563; 364/715.04; 364/748.01
[58] Field of Search ................................. 395/375, 775, 395/800, 386, 563, 733, 552, 553, 562, 568; 364/748, 736, 715.04

[56] References Cited

U.S. PATENT DOCUMENTS

| | | | |
|---|---|---|---|
| 4,325,120 | 4/1982 | Colley et al. | 395/412 |
| 4,562,553 | 12/1985 | Mattedi et al. | 364/745 |
| 4,569,016 | 2/1986 | Hao et al. | 395/565 |
| 4,777,613 | 10/1988 | Shahan et al. | 364/748 |
| 4,780,842 | 10/1988 | Morton et al. | 364/748 |
| 4,852,039 | 7/1989 | Maheshwari et al. | 364/748 |
| 5,027,308 | 6/1991 | Sit et al. | 364/748 |
| 5,051,894 | 9/1991 | Phillips et al. | 395/412 |
| 5,053,631 | 10/1991 | Perlman et al. | 364/748 |
| 5,058,048 | 10/1991 | Gupta et al. | 364/748 |
| 5,095,458 | 3/1992 | Lynch et al. | 364/787 |
| 5,187,678 | 2/1993 | Hori | 364/748 |
| 5,193,158 | 3/1993 | Kinney et al. | 395/591 |
| 5,237,667 | 8/1993 | Murakami et al. | 395/375 |
| 5,241,490 | 8/1993 | Poon | 364/715.04 |
| 5,258,943 | 11/1993 | Gamez et al. | 364/745 |
| 5,267,186 | 11/1993 | Gupta et al. | 364/748 |
| 5,272,660 | 12/1993 | Rossbach | 364/748 |
| 5,303,175 | 4/1994 | Suzuki | 364/748 |
| 5,517,438 | 5/1996 | Dao-Trong et al. | 364/748 |

OTHER PUBLICATIONS

IBM Technical Disclosure Bulletin vol. 37 No. 4B Apr. 1994 Single Cycle/Writeback Floating Point Denorm . . . pp. 315–318.

IBM Technical Disclosure Bulletin vol. 36 No. 12 Dec. 1993 Selective Prenormalization of operands . . . pp. 693–695.

IBM Technical Disclosure Bulletin vol. 36 No. 6B Jun. 1993 Normalizing Three Divide Operands in one cycle pp. 165–166.

IBM Technical Disclosure Bulletin vol. 36 No. 3 Mar. 1993 Hardware Instruction Generation pp. 269–272.

IBM Technical Disclosure Bulletin vol. 35 No. 4A Sep. 1992 Early Exception Detection . . . pp. 135–136.

IBM Technical Disclosure Bulletin vol. 35 No. 1B Jun. 1992 Shift Count Adjustment Logic pp. 166–167.

IBM Technical Disclosure Bulletin vol. 33 No. 9 Feb. 1991 Floating Point Exception Handling . . . Denormalization pp. 345–348.

IBM Technical Disclosure Bulletin vol. 32 No. 4A Sep. 1989 Single hex/binary Floating Point Unit pp. 243–249.

IBM Technical Disclosure Bulletin vol. 32 No. 3A Aug. 1989 Easy Biased Exponent Handling via 2's complement . . . pp. 325–329.

(List continued on next page.)

*Primary Examiner*—Parshotam S. Lall
*Assistant Examiner*—Viet Vu
*Attorney, Agent, or Firm*—Mark E. McBurney; Karl O. Hesse

[57] ABSTRACT

A floating point processing system and method of operation are disclosed. Single word precision denormalized operands and also misaligned operands are detected while such operands are being loaded into the first stage of a pipelined floating point unit. Such operands are aligned to a double word boundary and/or single word operands are normalized by a processing stages inserted into the pipe ahead of the first stage of the pipelined floating point unit thereby entering a one stage delay. In this way, misaligned operands and single word denormalized operands can be processed without the need for example to cancel the instruction, execute a normalize or alignment instruction and then re-launch the original instruction.

22 Claims, 4 Drawing Sheets

OTHER PUBLICATIONS

IBM Technical Disclosure Bulletin vol. 31 No. 6 Nov. 1988 Floating Point Unit Parallel Structure pp. 107–116.

IBM Technical Disclosure Bulletin vol. 31 No. 3 Aug. 1988 Implementation of Binary Floating Point Arch . . . pp. 4–9.

IBM Technical Disclosure Bulletin vol. 30 No. 9 Feb. 1988 Parallel Structure For High Performance Floating . . . pp. 411–414.

IBM Technical Disclosure Bulletin vol. 25 No. 10 Mar. 1983 Common Add, Substract, Compare Algorithm . . . pp. 5212–5217.

VARIABLE STAGE LOAD PATH AND METHOD OF OPERATION

RELATED APPLICATIONS

This application is related to inventions described in application Ser. Nos. 08/394,854 filed Feb. 27, 1995, 08/315,741 filed Sep. 30, 1994, 08/323,476 filed Oct. 14, 1994, 08/323,485 filed Oct. 14, 1994 and 08/323,484 filed Oct. 14, 1994.

TECHNICAL FIELD

This invention relates in general to systems for processing information and in particular to floating point units for processing arithmetic information.

BACKGROUND OF THE INVENTION

Floating point units perform various arithmetic operations such as addition, subtraction, multiplication, division, square root on numerical operands represented in floating point notation. Floating point notation utilizes the format of a sign, a mantissa, and an exponent to represent a number. Floating point units recognize floating point numbers because floating point numbers include a predetermined binary bit field with the sign, mantissa, and exponent each occupying the same bit positions regardless of the sign and magnitude of the actual number. Thus, a floating point unit ascertains the sign, mantissa, and exponent for any input floating point number by decoding bit positions and then determining the sign, the numeric value of the mantissa, and the magnitude of the exponent from the decoded binary bits representing the floating point number.

The IEEE promulgates standards (specifically the ANSI/IEEE 754-1985) that govern the representation of numbers in floating point notation to ensure uniformity among floating point notation users. The IEEE standards include extended, double word, and single word precision normalized formats. Denormalized formats are also included in the standard. Denormalized formats are particularly useful in representing very small numbers. The formats determine the quantity of significant figures or size of the bit field for any number represented in floating point notation. For example, a double precision format defines 64 bits in a double word operand with one bit representing the sign, eleven bits representing the magnitude of the exponent, and 52 bits representing the numeric value of the mantissa. Alternatively, a single precision format defines 32 bits in a single word operand with one bit representing the sign, 8 bits representing the magnitude of the exponent, and 23 bits representing the numeric value of the mantissa.

Normalization of a floating point number requires the leading one in the mantissa always be placed to the left of the decimal point with the magnitude of the exponent adjusted accordingly. Consequently, the IEEE standard places the leading one in the most significant bit of the mantissa bit field so that the leading one appears not included and is referred to as a "hidden" bit. Accordingly, in double precision format, the mantissa bit field actually constitutes 53 bits with the leading one "hidden", while in single precision format, the mantissa bit field actually constitutes 24 bits with the leading one "hidden".

Since a normalized number requires that the leading binary one bit in the mantissa be in the most significant position of the mantissa field, the exponent ends up being a smaller value than would be required if the leading one bit could be placed in a less significant position. Accordingly when a very small number is to be represented, in denormalized form, the most negative exponent is used in combination with movement of the mantissa to a less significant position thereby gaining the ability to represent numbers that are orders of magnitude smaller than in could be represented in normalized formats but at the cost of carrying fewer significant digits in the mantissa. In the IEEE standard, the exponent field is biased so that in effect, an exponent value of binary one is the most negative exponent that can be represented, and in a double precision number, an exponent of hexadecimal 3FF is an exponent value of zero. To represent a number smaller than two to the minus 1023, the number must be in denormalized format. In denormalized format, the exponent field is set to a binary zero and the mantissa is shifted in the mantissa field until the number can be represented.

Due to their adjusted mantissa, normalized floating point numbers rarely have equal exponents. Accordingly, when floating point units add or subtract a second operand represented in floating point notation with a first operand represented in floating point notation, the mantissa of the second operand typically must be shifted because an addition or subtraction cannot be performed until the exponent of the second operand equals the exponent of the first operand. The floating point units equalize the first and second exponents by shifting the mantissa of the second operand relative to the mantissa of the first operand. Shifting the second mantissa to the right increases its exponent one for each shift, while shifting the second mantissa to the left decreases its exponent one for each shift.

Some of the present processing systems detect an instruction and the type of operand(s) associated with the instruction prior to the instruction's execution. Under the IEEE 754-1985 standard, the types of operands include ZERO, INFINITY, QUIET NOT A NUMBER, SIGNALING NOT A NUMBER, DENORMALIZED, and NORMAL NUMBER. For example, if one of the operands is denormalized, the processing system must execute a special instruction that normalizes the operand before execution of the original instruction. Alternatively, if the instruction is add and one of the operands is infinity, the processing system must execute a special handling operation that replaces the result of the addition with the number that represents infinity in IEEE 754-1985 standard. After determining whether special handling is necessary, the processing system executes the original instruction.

Although some of the operand types require special handling, only the denormalized operand type requires the execution of special instructions prior to the execution of the original instruction. The remaining five types of operands either require no special instructions (e.g., a normal number operand) or require a special instruction be executed during the execution of the original instruction (e.g., an infinity operand). Consequently, the majority of instructions and operand types do not require detection prior to the execution of instruction using the instruction's associated operand(s). Accordingly, detecting the instruction and operand types prior to the execution of every instruction unnecessarily increases the number of clock cycles required to perform every floating point instruction, resulting in the decrease in operating speed of the processing system.

Accordingly, a processing system that eliminates unnecessary clock cycles in detecting the instruction and operand types will have an increased operating speed.

One present floating point processing system includes a multiple stage processing pipeline for executing instructions, and circuitry within the pipeline for detecting the validity of the instruction concurrently with the execution of the instruction by the pipeline. In this system, the circuitry detects the type of operand concurrently with the processing of the operand by the pipeline. If the operand type is denormalized, the circuitry cancels the instruction and directs the processing system to normalize the operand and re-launch the instruction and the normalized operand into the pipeline. When the operand type and instruction produce a special case, the circuitry replaces the result from the processing of the operand by the pipeline with a predicted result such as, a not a number operand, or an actual zero for two simple examples. Accordingly, every denormalized number operand now requires that the instruction be canceled and re-launched after the number has been normalized which can have a significant impact on processor performance.

SUMMARY OF THE INVENTION

In a first aspect of the invention, checking logic determines whether an operand is valid, meaning that it complies with the requirements of the processing unit, in the same clock cycles as the operand is being received from storage.

In a second aspect of the invention, certain invalid operands are converted into valid operands in the same clock cycles as the operand is being loaded into the processing unit.

In a third aspect of the invention, certain invalid operands are held for one or more cycles while they are being converted into valid operands without cancelling the executing instruction or requiring that it be re-launched.

In a fourth aspect of the invention, detection, during the load cycle, of a single precision instruction using a denormalized operand causes the operand to be held and pass through a normalize logic stage prior to entering the processing unit.

In a fifth aspect of the invention, detection of a double precision instruction using a misaligned double word operand causes the operand to be held and pass through an align logic stage prior to entering the processing unit.

It is a technical advantage of the present invention that an operand is held and an extra cycle is inserted only into the processing of certain single or double precision instructions without effecting the processing time for other operands and without requiring that the instruction be cancelled and other instructions executed to convert the operand and the instruction then re-launched.

BRIEF DESCRIPTION OF THE DRAWINGS

An illustrative embodiment of the present invention and its advantages are better understood by referring to the following descriptions and accompanying drawings, in which.

DETAILED DESCRIPTION OF A PREFERRED EMBODIMENT

An illustrative embodiment of the present invention and its advantages is better understood by referring to FIGS. 1–4 of the drawings, like numerals being used for like and corresponding parts of the accompanying drawings.

Figure 1:
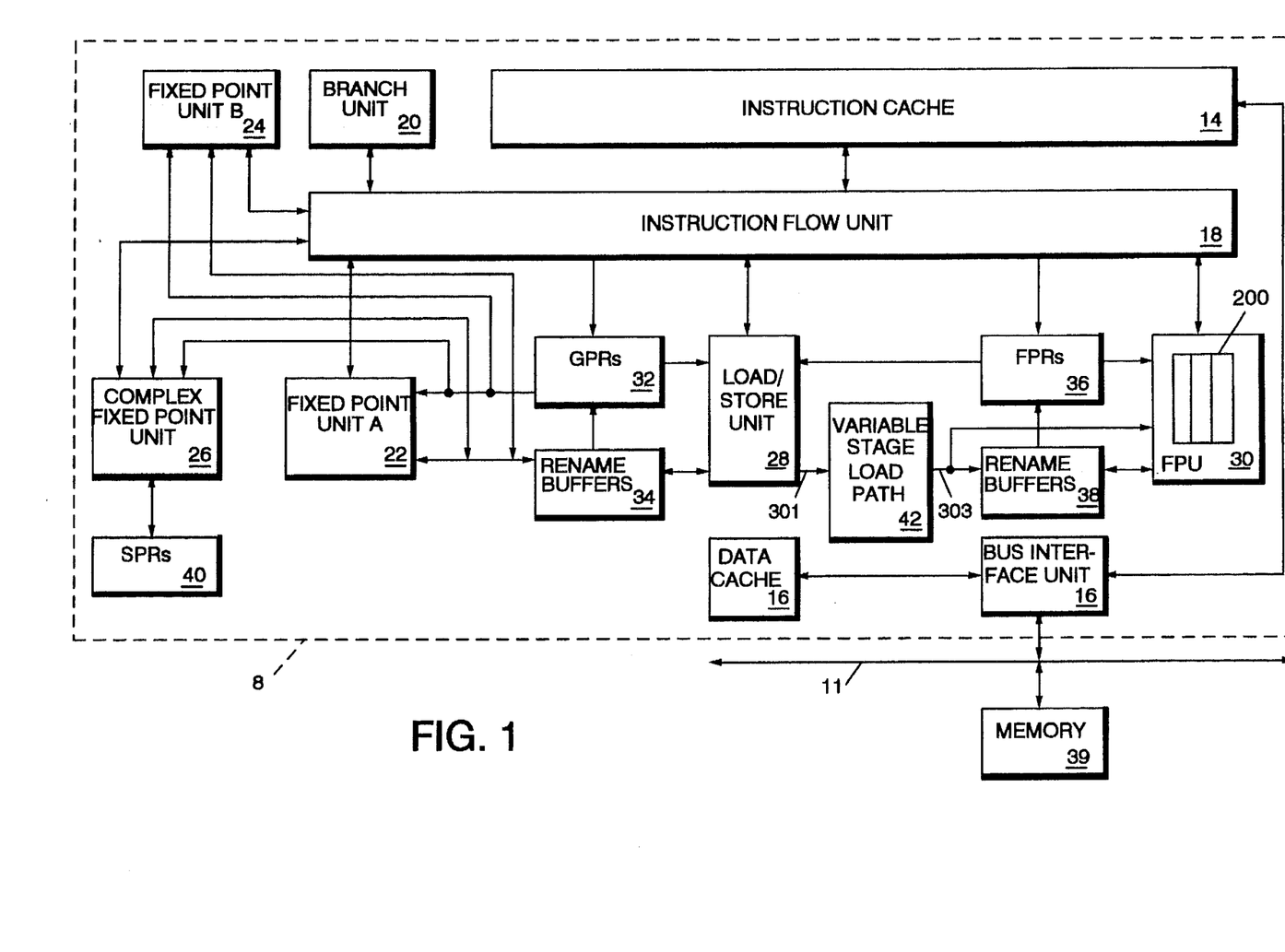
FIG. 1 is a block diagram of a system for processing information in which the preferred embodiment finds utility.

FIG. 1 is a block diagram of a system for processing information, indicated generally at 10, in which a preferred embodiment of the invention finds utility. In the system, a processor 8 of system 10 is a single integrated circuit superscalar microprocessor. Accordingly, as discussed further hereinbelow, system 10 includes various units, registers, buffers, memories, and other sections, all of which are formed by integrated circuitry. Also, system 10 operates according to reduced instruction set computing ("RISC") techniques. As shown in FIG. 1, a system bus 11 is connected to a bus interface unit ("BIU") 12 of system 10. BIU 12 controls the transfer of information between processor 8 and system bus 11.

BIU 12 is connected to an instruction cache 14 and to a data cache 16 of system 10. These connections as well as other instruction and data paths in processor 8 have sixty four information lines as well as clocking control lines. In FIG. 1, all information paths are shown with a single line, and each such data path transfers multiple bits of information and most information paths transfer sixty four bits. Likewise, unless otherwise specified, all control paths carrying clock and other control signals to registers, multiplexers, and other sections of system 10 operate carry multiple bits of information.

Instruction cache 14 outputs instructions to an instruction flow unit 18. In response to such instructions from instruction cache 14, instruction flow unit 18 selectively outputs instructions to other execution circuitry of system 10.

In addition to instruction flow unit 18, the execution circuitry of system 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28, a variable stage load path ("VSLP") 42 according to the invention and a floating point unit ("FPU") 30. FXUA 22, FXUB 24, CFXU 26 and LSU 28 input their source operand information from general purpose architectural registers ("GPRs") 32 and fixed point rename buffers ("FXRBs") 34. FXUA 22, FXUB 24, CFXU 26 and LSU 28 output results (destination operand information) of their operations for storage at selected entries in fixed point rename buffers 34.

Also, CFXU 26 inputs and outputs source operand information and destination operand information to and from special purpose registers ("SPRs") 40. Moreover, LSU 28 inputs source operand information from floating point architectural registers ("FPRs") 36.

FPU 30 inputs its source operand information from FPRs 36, floating point rename buffers ("FPRBs") 38, and via VSLP 42 from LSU 28. LSU 28 and FPU 30 output results (destination operand information) of their operations for storage at selected entries in floating point rename buffers 38.

In response to a Load instruction, LSU 28 inputs information from data cache 16 and copies such information to selected ones of rename buffers 34 and 38 and FPU 30. If such information is binary floating point information, the information passes through VSLP 42 where it may be normalized and or aligned to the double word bus boundary before being sent to FPU 30 or the rename buffers 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Instruction flow unit 18 outputs information to GPRs 32 and FPRs 36. From instruction flow unit 18, branch unit 20 inputs instructions and signals indicating a present state of system 10. In response to such instructions and signals, branch unit 20 outputs (to instruction flow unit 18) signals indicating suitable memory addresses storing a sequence of instructions for execution by system 10. In response to such signals from branch unit 20, instruction flow unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, instruction flow unit 18 selectively dispatches the instructions to selected ones of execution units 20, 22, 24, 26, 28 and 30. Each execution unit executes one or more instructions of a particular class of instructions. For example, FXUA 22 and FXUB 24 execute a first class of fixed point mathematical operations on source operands, such as addition, subtraction, ANDing, Oring and XORing. CFXU 26 executes a second class of fixed point operations on source operands, such as fixed point multiplication and division. FPU 30 executes floating point operations on source operands, such as floating point multiplication and division operations.

As information is stored at a selected one of rename buffers 34, such information is associated with a storage location (e.g. one of GPRs 32) as specified by the instruction for which the selected rename buffer is allocated. Information stored at a selected one of rename buffers 34 is copied to its associated one of GPRs 32 in response to signals from instruction flow unit 18. Instruction flow unit 18 directs such copying of information stored at a selected one of rename buffers 34 in response to "completing" the instruction that generated the information. Such copying is called "writeback". System 10 includes multiple "writeback" paths between rename buffers 34 and GPRs 32, for transferring information from multiple ones of rename buffers 34 to GPRs 32 during a single cycle of system 10.

As information is stored at a selected one of rename buffers 38, such information is associated with one of FPRs 36. Information stored at a selected one of rename buffers 38 is copied to its associated one of FPRs 36 in response to signals from instruction flow unit 18. Instruction flow unit 18 directs such copying of information stored at a selected one of rename buffers 38 in response to "completing" the instruction that generated the information. System 10 includes multiple "writeback" paths between rename buffers 38 and FPRs 36, for transferring information from multiple ones of rename buffers 38 to FPRs 36 during a single cycle of system 10.

System 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "pipelining". In the system in which the preferred embodiment finds utility, an instruction is normally processed as six stages, namely fetch, decode, dispatch, execute, completion, and writeback.

In the fetch stage, instruction flow unit 18 selectively inputs (from instructions cache 14) one or more instructions from one or more memory addresses storing the sequence of instructions discussed further hereinabove in connection with branch unit 20 and instruction flow unit 18.

In the decode stage, instruction flow unit 18 decodes up to four fetched instructions.

In the dispatch stage, instruction flow unit 18 selectively dispatches up to four decoded instructions to selected (in response to the decoding in the decode stage) ones of execution units 20, 22, 24, 26, 28 and 30 after reserving a rename buffer entry for each dispatched instruction's result (destination operand information). In the dispatch stage, operand information is supplied to the selected execution units for dispatched instructions. System 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, system 10 is able to execute instructions out-of-order relative to their programmed sequence.

In the completion stage, instruction flow unit 18 indicates an instruction is "complete".

In the writeback stage, instruction flow unit 18 directs the copying of information from rename buffers 34 and 38 to GPRs 32 and FPRs 36, respectively. Likewise, in the writeback stage of a particular instruction, system 10 updates its architectural states in response to the particular instruction.

In the preferred embodiment, during each machine cycle of processor 8, processor 8 normally finishes a stage of instruction processing for each instruction being processed. Nevertheless, some instructions (such as an iterative instruction executed by FPU 30) may take more than one machine cycle to finish the execute stage of instruction processing. Examples of iterative instructions are a divide instruction and a square-root instruction. Accordingly, a variable delay may occur between a particular instruction's execution and completion stages in response to the variation in time required for processing of preceding instructions.

In the preferred embodiment, FPU 30 includes two reservation stations although more than two can be used in alternate embodiments. Each reservation station receives and stores, from instruction flow unit 18 through an instruction/target address bus, an instruction and its associated rename buffer target addresses, that is the addresses of the instructions assigned buffers in FPRB 38, and also register file target addresses, that is, the addresses of the instructions specified registers in FPR 36.

While instruction flow unit 18 dispatches an instruction, if one or more of the instruction's operands written by processor 8 into one of reservation stations of FPU 30 is not validly available from one of the operand suppliers, then the instruction has an unresolved dependency on another instruction's result. If an instruction has such an unresolved dependency, processor 8 resolves the dependency after each unavailable operand later becomes validly available from either the load bypass bus 303 or FPU result bus. For example, if one of the operands is denormalized, the processing system must execute a special instruction that normalizes the operand before execution of the original instruction. Alternatively, if the instruction is add and one of the operands is infinity, the processing system must execute a special handling operation that replaces the result of the addition with the number that represents infinity in IEEE 754-1985 standard.

Although some of the operand types require special instructions, they can be determined in advance and scheduled into the instruction queue. Only the denormalized operand type required, prior to the instant invention, the execution of a special instruction to normalize the operand prior to the execution of the original instruction. With the instant invention, the denormalized single word operand is passed through an extra stage of the variable load path 42 introducing a one cycle latency but avoiding the need to cancel the original instruction and insert the special instruction prior to re-launching the original instruction.

At a suitable moment when the pipeline is available to process an instruction, FPU 30 sequencer circuitry selects one of reservation stations. In response to being selected by processor 8, the selected reservation station outputs ("launches") its stored instruction and associated rename buffer target address and register file target address into the execution pipeline through instruction/target multiplexer 118. In connection with launching (i.e. initiating processing/ execution of) an instruction, the selected reservation station launches the instruction's associated operand(s) into execution pipeline 200 through the operand multiplexers.

Pipeline 200 is the only execution path in FPU 30. Accordingly, each instruction processed by FPU 30 is processed only through the pipeline in order to generate and output a result on the FPU result bus in response to the instruction. In response to successfully launching an instruction from a reservation station, the reservation station is available to input and store another instruction and its operands. By comparison, if an instruction is not successfully launched from a reservation station during a particular cycle of processor 8, then the reservation station continues to store (1) the instruction, (2) the instruction's associated rename buffer target address, (3) the instruction's associated register file target address, and (4) the instruction's associated operand(s), until a later cycle of processor 8.

An instruction is considered to have launched successfully if all of its necessary operands are valid in the first stage of the execution pipeline.

If it is found that one or more of the operands are denormalized, they are not valid in the first stage of the pipeline, and the execution of the instruction must be cancelled until the operands can be normalized. By use of the instant invention which will be described in detail with respect to FIGS. 2 and 3, a single cycle of latency will be introduced but the single word operand will arrive at the first stage of pipeline 200 in valid normalized format.

In the preferred embodiment, FPU 30 includes temporary registers for storing intermediate results generated during an iterative instruction execution by FPU 30. Accordingly, temporary registers input information from the pipeline through the FPU result bus. Temporary registers output information to the pipeline through a bus connected to each of multiplexers.

FPU 30 processes a successfully launched instruction through each stage of the pipeline. After the instruction is processed through the last stage of the pipeline, the pipeline outputs a result of the instruction on the FPU result bus. FPU 30 stores the result from the FPU result bus into one of FPRBs 38 selected in response to the instruction's associated rename buffer target address. At a suitable moment, instruction flow unit 18 outputs a signal through an FPU__WRITEBACK line to FPRBs 38. In response to this signal, information is output from one or more of FPRBs 38 to FPRs 36. The output information is then stored in a FPR 36 selected in response to the instruction's associated register file target address.

During execution of the iterative instruction, FPU 30 convergently generates a result by executing the sequence of instructions from its sequencer. FPU 30 executes the sequence of instructions from its sequencer by processing the sequence of instructions through the pipeline. Some of these instructions have data dependencies upon results of earlier instructions in the sequence.

Figure 2:
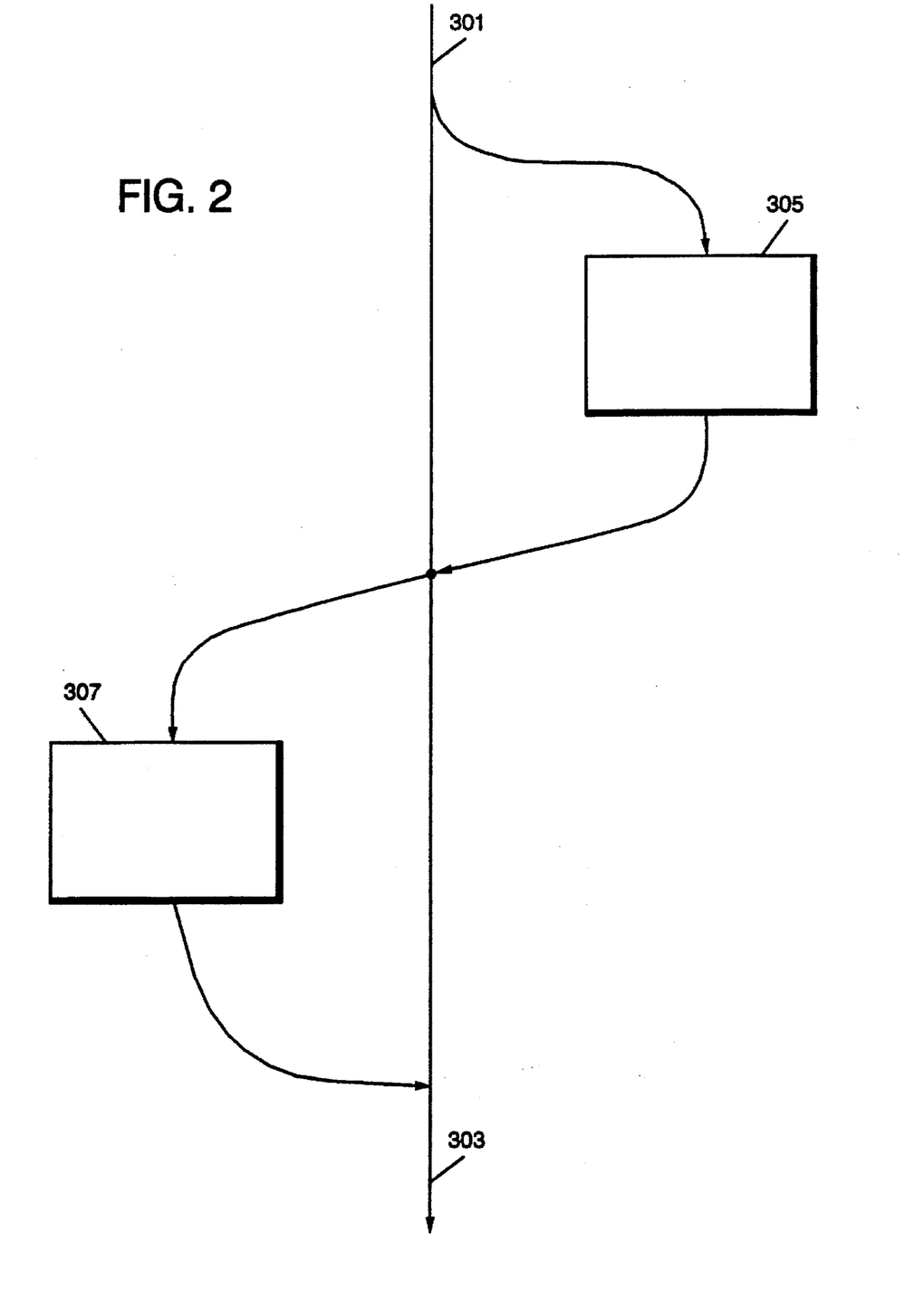
FIG. 2 is a simplified diagram showing how the stages of variable stage load path of the invention are bypassed or traversed.
Figure 3:
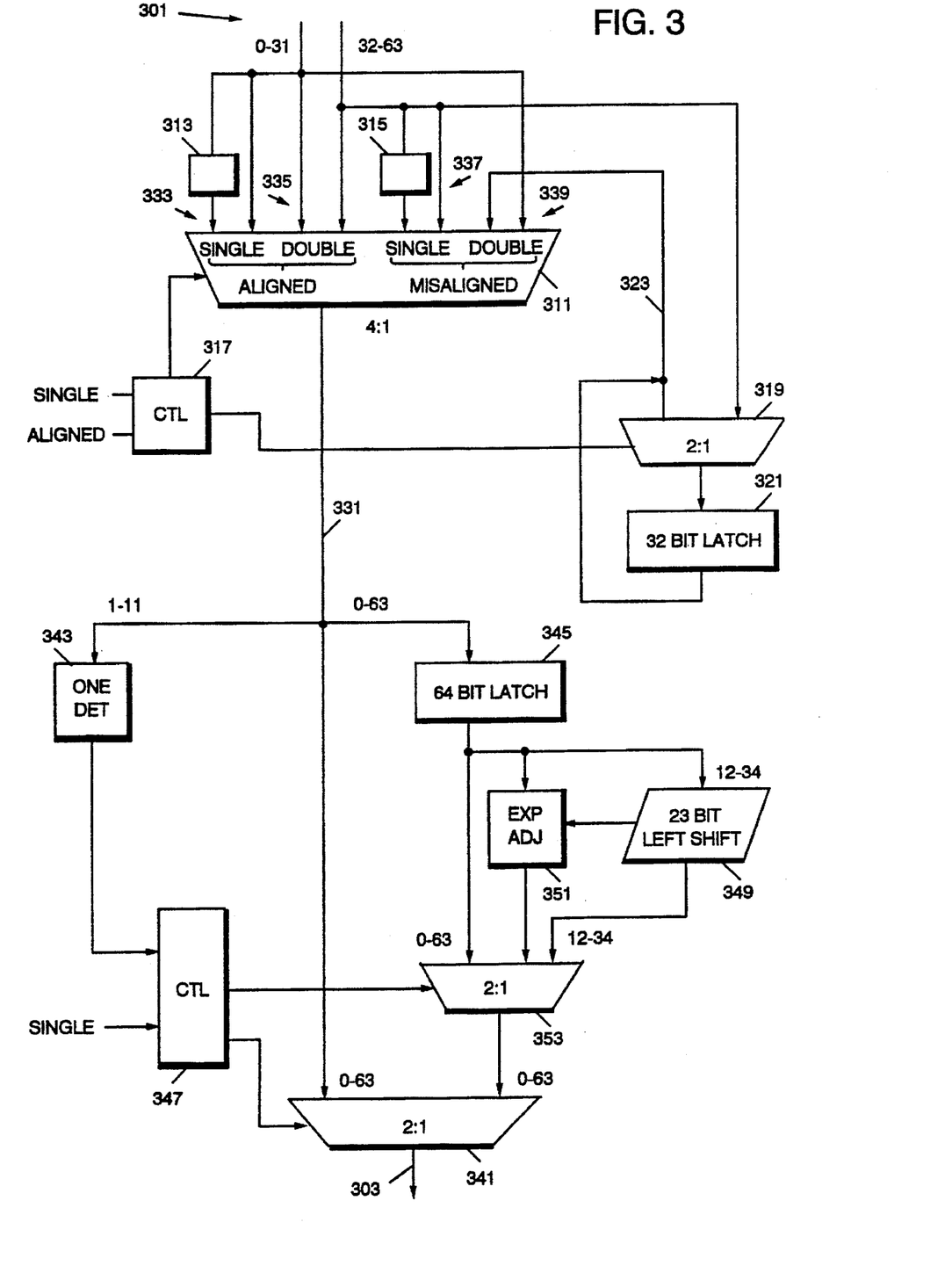
FIG. 3 is a block diagram of the circuits of the present invention.

Referring now to FIGS. 2 and 3, a detailed description of the variable stage load path (VSLP) 42 of the invention will be set out. FIG. 2 is a simplified diagram showing how the stages of load path 42 are bypassed or traversed. Sixty four line information bus 301 connects VSLP 42 to LSU 28. In the event that the operand being received from LSU 28 is a valid normalized and aligned operand, multiplexor gates are controlled to route the operand directly from bus 301 to bus 303 which connects VSLP 42 to the FPU 30 thereby avoiding any delay in the loading of normalized and aligned operands into FPU 30.

In the event that the operand is misaligned double word operand, it is routed through aligner logic 305 where it is stored while the instruction using this operand is staged until the next double word is sent from the LSU 28. The delay is required because a misaligned double word operand is not complete but requires another memory fetch to obtain the remainder of the operand. While the memory fetch is being accomplished, the acquired portion of the misaligned operand is placed into the proper even boundary alignment and the fetched portion is placed on the odd boundary. No delay is required to align a single word operand because it is merely moved from the odd boundary position of bus 301 to the even boundary position, also called the double word boundary, of the bus 303 as it is received from LSU 28.

In the event that the operand is a denormalized single word operand or a single word of value zero, it is routed through normalization logic 307 where it is normalized while the instruction using this operand is delayed for one cycle. The delay is required this time due to the complexity of the logic 307 which must shift the mantissa and convert the amount of shift into the correct exponent for the normalized operand. Each left shift of one bit position requires the exponent to be decremented by a one.

After once having caused a one cycle delay in order to align a double word operand or to normalize a single word operand, the process can continue using misaligned and/or denormalized numbers without further delay due to the pipeline effect of the variable stage load path of the invention.

The aligned double word operand provided by alignment logic 305 is returned to data bus 303 where it is provided to FPU 30 or FRB 38 for processing as a valid aligned number. Likewise the output of normalizer logic 307 is returned at data bus 303 where it is provided to FPU 30 or FRB 38 for processing.

Having explained, with respect to FIG. 2, the three routes for the processing of operands, the reader is now referred to FIG. 3 where the implementation of the paths and logic of FIG. 2 is shown. Bus 301 enters the FIG. 3 at the top and is connected to four to one multiplex logic 311 directly at 335 and by way exponent converting circuits 313 at 333 and 315 at 337. These converting circuits convert the single precision exponent field from eight bits wide to eleven bits wide and rebiases the exponent. Increasing the size of the exponent field allows denormalized single word operands to be normalized without losing information in the conversion. The exact connections of bus 301 to multiplex logic 311 will be set out later in more detail as the function of alignment of single and double word operands to the double word boundary is explained The output of control circuit 317 is connected to 4:1 multiplex logic 311 and to 2:1 multiplex logic 319. Inputs to control circuit 317 are connected to the instruction flow unit 18. The signals are provided to logic circuits within control 317 that determine if the operand being loaded is aligned and if it is a single or double word operand. Multiplex logic 311 is controlled by control circuits 317 which cause multiplex logic 311 to pass single word aligned operands and double word aligned operands from bus 301 directly through to internal bus 331 without delay. Misaligned single and double word operands are aligned by the arrangement of the connections of the bus 301 to the alignment inputs to multiplex logic 311. Single word operands can be aligned to the double word boundary without introducing delay but misaligned double word operands are incomplete and therefore require another fetch cycle to obtain the remainder of the operand from memory.

A misaligned single word is found on bus 301 lines 32–63 instead of on the double word boundary 0–31. Alignment is accomplished by passing the bits 33–40 through exponent converter 315 and then connecting at 337, the eleven bit output from converter 315 to inputs 1–11 of multiplex logic 311. Lines 0 and 41–63 of bus 301 are connected at 337 to input lines 11–34 thereby aligning the single expanded exponent word onto the double word boundary.

The fetch cycle for the second half of a misaligned double word is accomplished while the first part of the operand is stored in latch register 321 by the connection of 301 bus lines 32–63 directly to multiplex logic 319. When the remainder of the double word operand is fetched, it appears on lines 0–31 of bus 301 which are connected to inputs 32–63 at 339 and is combined with the first portion in multiplex logic 311 via feedback path 323 which is connected to input 0–31 of multiplex logic 311 at 339. The second set of input lines to 2:1 multiplex logic 319 is connected to feedback bus 323 and the output lines from multiplex logic 319 are connected to the inputs of latch register 321. The outputs of latch register 321 are connected the feedback bus 323. In this way, the content of latch 321 can be recycled into itself for as many cycles as necessary to continue to store the first portion of the double word until the last portion is available, either from cache or from main memory.

Although the input connections from which latched data originated are bus 301 lines 32–63, the feedback bus 323 is connected to multiplex logic 311 input connections 0–31. In this way the stored word is moved from the odd boundary line 32 of bus 301 to the even boundary line 0. The second word of the fetched double word is connected to multiplex logic 319 for storage in latch 321 as it may be the first word of the next misaligned double word operand.

Aligned double word operands and aligned normalized single word operands on internal bus 331 pass directly through 2:1 multiplex logic 341 to the bus 303 where they are available to the FPU 30. Because denormalized double word operands must be normalized in a double pass through the FPU 30 as explained earlier, such operands pass directly through to bus 303.

Binary one bit detector 343 is connected to the exponent lines of bus 331 to detect a zero exponent. A zero exponent indicates that the operand is either denormalized or has a zero value. The output of detector 343 is connected to an input of control circuit 347. Another input to control circuit 347 is connected to receive a signal when a floating point single precision instruction is being executed. In this way, denormalized single word operands are recognized in logic 307 and stored in sixty four bit latch register 345 which also has its input lines connected to bus 331. The output lines of latch register 345 are connected to exponent adjustment logic 351, bypass multiplex logic 353 and to mantissa left shifter 349. The operand output of mantissa left shifter 349 is connected to multiplex logic 353 and the shift count output from shifter 349 is connected to exponent adjuster 351. The output lines from exponent adjuster 351 and mantissa shifter 349 are connected to the exponent input lines 1–11 and mantissa input lines respectively 12–34 of one of the sets of inputs to multiplex logic 341. Binary one bit detector 343 detects the binary zero condition of the exponent field which in combination with the load floating point single precision instruction allows control 347 to control multiplex logic 341 to block the data on bus 331 and to pass the normalized operand after a one cycle delay required for the mantissa left shift and exponent adjustment and rebias. The mantissa is shifted in register 349 and the number of shifts necessary to bring a binary one bit into the high order position (hidden bit position) is used by adjust logic 351 to select the correct exponent value.

This new correct exponent value can be processed in the FPU 30 because the FPU 30 exponent field is eleven bits wide as compared with the eight bits of exponent stored under the IEEE standard for single precision operands.

In the event that the single word operand was a binary zero operand, the mantissa will also be all binary zero bits which will be recognized after twenty three shifts without a binary one bit appearing in the hidden bit position. This shift count and no binary one is recognized in adjuster 351 to leave the exponent field as an all zero field.

After normalizing a single word operand or detecting a zero single word operand, control 347 stores a normalize stage indicator which indicates that one cycle of latency has been introduced into the load operand path and the all subsequent sequential operands must be delayed by one cycle until the sequence of contiguous operand fetch cycles is broken. Thereafter, operands can again flow directly through multiplex logic 341 without delay by latch register 345 until the next denormalized single word or zero value single word operand is encountered.

OPERATION OF THE PREFERRED EMBODIMENT

Figure 4:
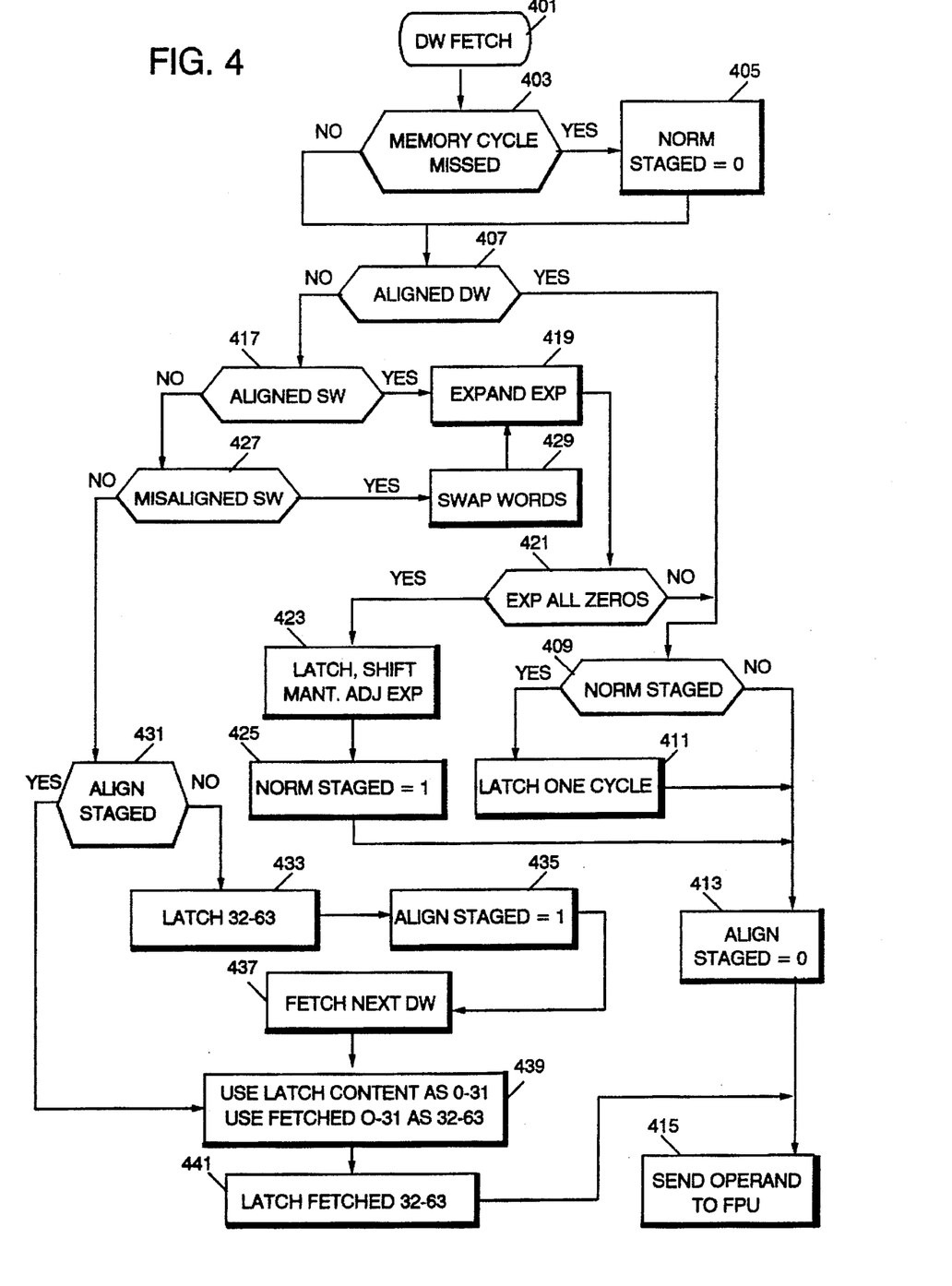
FIG. 4 is a flow diagram showing the processing of double and single word precision operands according to the present invention.

Referring now to FIG. 4, the operation of the preferred embodiment will be described. In FIG. 4, the operation starts at the top of the figure at the block 401 labeled DW FETCH, meaning double word fetch, which may result from the scheduling of an instruction which will execute using either single or double word operands. The double word cache 16 is then accessed by LDSR 28 at block 401 of FIG. 4 to obtain an operand. At decision block 403, it is determined whether a memory fetch cycle had been missed during which a previous delay was caught up and the indicator of the existence of such delay is reset at block 405. At block 407, it is determined whether the operand an aligned double word. If it is, it can be sent immediately following the preceding operand to the FPU 30. If a preceding operand has been delayed for normalization, the normalize staged indicator will be set to a binary one and detected at decision block 409. If there has been a delay without an intervening missed memory fetch cycle, this operand must also be delayed one cycle at block 411 to avoid superposition upon the preceding operand. Having arrived at this state in the method of the invention, it is clear that no part of this operand is to be saved for combination with the following operand for alignment and therefore the align staged indicator is reset at block 413 and this aligned double word operand is sent to the FPU 30 at block 415.

Returning to decision block 407, if it was determined that the operand was not an aligned double word, it is tested at block 417 for aligned single word status. If the answer is yes, the exponent of the operand is expanded and rebiased from eight to eleven bits at block 419 and then the exponent field is tested for an all binary zero condition at block 421. All zeros means that the operand may be denormalized or a zero operand. Assuming that at least one binary one bit is found in the exponent field, the state of the normalization staged indicator is again tested at block 409 to determine when to place this single word aligned and normalized non-zero operand on the output bus 303 at block 415.

If the exponent is found at block 421 to contain no binary one bits, the mantissa is shifted left and the exponent field is decremented at block 423 until a binary one bit appears in the hidden bit position of the mantissa field. During this manipulation, the instruction must be staged by one cycle to account for the time expanded but it need not be cancelled and re-scheduled as in the prior art. The delay is recorded at block 425 in the normalization delay indicator of control logic 347 and the operand is sent to the FPU 30 without further delay because the previous operand has already been passed to the FPU during manipulation of the instant operand even if the previous operand also required normalization.

Returning now to block 417, if the operand was a misaligned single word or double word operand, control of the method passes to block where the instruction being executed is tested for single word operand status. If it is a single word operand, the 0–31 bit word is swapped with the 32–63 bit word at block 429 to place the single word operand on the double word boundary of the bus. The operand is then passed to the FPU 30 with or without a one cycle delay depending upon the status of the normalization indicator in control logic 347.

If at block 427, the operand was determined from the executing instruction to be a double word, it must be misaligned and further is not complete in itself. If the preceding operand was not also a misaligned double word, as detected at block 431 from the state of the alignment indicator in control logic 317, the current double word contains only the bits 0–31 of the double word operand and further, these bits are being carried on the 32–63 bit lines of bus 301. These bits are stored in a 32 bit register of latches at block 433 and the alignment indicator is set to a binary one at block 435 causing the executing instruction to be delayed, but it not cancelled or re-scheduled, until the second half of the double word operand is fetched at block 437.

The method of the invention in this embodiment then progresses to the swap step at block 439 where the halves of these two double words are combined to form the complete double word operand properly aligned on the double word boundary of bus 331 shown in FIG. 3. The content of the latch is used at bits 0–31 and the newly fetched bits on bus 301 lines 0–31 are used as operand bits 32–63. In preparation for the possible fetch of another sequential misaligned double word operand, the remaining 32–63 bit half of the last fetched double word is saved in latch register 321 at block 441. It may become the first or 0–31 bit word of a sequentially following misaligned double word operand.

If the next instructions being executed are such that the next operand is not a misaligned double word, this saved half is discarded by resetting the alignment staged indicator at block 413 as previously described with respect to the loading of an aligned double word operand or a single word operand.

The remaining possibility is that block 431 detects a misaligned double word operand following another misaligned double word operand. In this event, the latest fetched double word contains the second part of the operand and it need only be combined at block 439 without the need for a still further memory fetch. The process of the method then proceeds as before in blocks 439 and 441 and the now aligned next double word operand can be provided to the FPU 30 at block 415.n From the foregoing description of FIGS. 3 and 4, and from the figures themselves, it will be noted that the decision blocks 407, 417, 427, and 431 and function blocks 435 and 413 are embodied in the control logic circuits 317 and that decision blocks 403, 409, 417, and 427 and function blocks 405, and 425 are embodied in control logic circuits 347 in this preferred embodiment of our invention. Likewise it will be clear after consideration of these two figures and the foregoing description that the connections of bus 301 to the inputs of four to one multiplex logic 311 embody function blocks 419, 429 and 439. It will also be clear that other forms of implementation of the method of the invention such as programmed logic array or alternative forms of sequential logic can be employed.

Therefore although an illustrative embodiment of the present invention and its advantages have been described in detail hereinabove, the our descriptions are an example of what we consider to be a best mode and should not be interpreted as limitations. Various changes, substitutions and alterations can be made in the illustrative embodiments without departing from the breadth, scope and spirit of the present invention. The breadth, scope and spirit of the present invention should not be limited by the illustrative embodiments, but should be defined only in accordance with the following claims and equivalents thereof.

What is claimed is:

1. A digital number processing system, comprising:
    a multiple stage pipelined unit for executing instructions to perform operations on operands; and
    a variable stage load path connected to a source of operands and connected to said pipelined unit for providing said operands to said pipelined unit, said variable stage load path further comprising:
    control means for detecting whether an operand is in a valid form while said operand is being loaded into a first stage of said pipelined unit, said control means staging execution of an instruction when said operand is in invalid form;
    logic means for converting said operand to a valid form while said operand would otherwise be processed by said first stage of said pipelined unit thereby introducing one stage of delay;
    gate means for presenting said converted operand to said pipelined unit for processing after said one stage of delay.

2. The number processing system of claim 1 wherein said gate means of said variable stage load path further comprises:
    bypass means for presenting a valid operand to of said pipelined unit without introducing said stage of delay.

3. The number processing system of claim 2 wherein said bypass means comprises logic gates within said gate means.

4. The number processing system of claim 1 wherein said pipelined unit comprises a floating point number processing unit and wherein said control means of said variable stage load path detects a misaligned operand and said logic means converts said misaligned operand to an aligned operand.

5. The number processing system of claim 4 wherein said variable stage load path further comprises:

storage means in said logic means, said storage means storing a first portion of said misaligned operand while a second portion of said misaligned operand is being obtained from said source of operands; and logic gates in said gate means for combining said first portion of said misaligned operand and said second portion of said misaligned operand into aligned position while presenting said converted operand to said pipelined unit for processing after said one stage of delay.

6. The number processing system of claim 5 wherein said variable stage load path further comprises:

logic gates in said gate means for aligning said first portion of said misaligned operand onto a double word boundary position when said operand is a single word operand while presenting said converted operand to said said pipelined unit for processing without delay.

7. The number processing system of claim 5 wherein said variable stage load path further comprises:

second control means for detecting a denormalized number, said second control means staging said execution of said instruction when said operand is a denormalized number;

second logic means for converting said operand to a normalized number while said operand would otherwise be processed by said first stage of said pipelined unit thereby introducing one stage of delay;

second gate means for presenting said converted operand to said pipelined unit for processing after said one stage of delay.

8. The number processing system of claim 7 wherein said variable stage load path further comprises:

storage means in said second logic means, said storage means storing a mantissa portion of said denormalized operand while said mantissa portion of said denormalized operand is being converted to the mantissa of a normalized number, said normalized number having the same value as said denormalized number; and exponent adjustment means in said second logic means for adjusting said exponent portion of said denormalized operand into an exponent of said normalized operand which when combined with said converted mantissa portion yields said normalized number having said same value as said denormalized number.

9. The number processing system of claim 8 wherein said variable stage load path further comprises:

shift means in said second logic means, said shift means shifting said mantissa portion of said denormalized operand until a binary one bit appears in a hidden bit position of said mantissa portion and providing to said exponent adjustment means, a count of the shifts required to cause said binary one bit to appear in said hidden bit position.

10. The number processing system of claim 9 wherein said exponent adjusting means of said second logic means in said variable stage load path further comprises:

table look up means for adjusting said exponent portion of said denormalized number from all binary zero bits to a number representing said count of said shifts required to cause said binary one bit to appear in said hidden bit position of said mantissa portion.

11. The number processing system of claim 10 wherein said table look up means of said second logic means in said variable stage load path further comprises:

means for adjusting said exponent portion of said denormalized number from all binary zero bits to a biased number representing said count of said shifts required to cause said binary one bit to appear in said hidden bit position of said mantissa portion, said biased number being on a scale wherein 3FF represents a value of zero.

12. The number processing system of claim 1 wherein said pipelined unit comprises a floating point number processing unit and wherein said control means of said variable stage load path detects a denormalized operand and said logic means converts said denormalized operand to a normalized operand.

13. The number processing system of claim 12 wherein said variable stage load path further comprises:

storage means in said logic means, said storage means storing a mantissa portion of said denormalized operand while said mantissa portion of said denormalized operand is being converted to a mantissa of a normalized number, said normalized number having a same value as said denormalized number; and exponent adjustment means in said logic means for adjusting said exponent portion of said denormalized operand into an exponent of said normalized operand which when combined with said converted mantissa portion yields said normalized number having said same value as said denormalized number.

14. The number processing system of claim 13 wherein said variable stage load path further comprises:

shift means in said logic means, said shift means shifting said mantissa portion of said denormalized operand until a binary one bit appears in a hidden bit position of said mantissa portion and providing to said exponent adjustment means, a count of the shifts required to cause said binary one bit to appear in said hidden bit position.

15. The number processing system of claim 14 wherein said exponent adjusting means of said logic means in said variable stage load path further comprises:

table look up means for adjusting said exponent portion of said denormalized number from all binary zero bits to a number representing said count of said shifts required to cause said binary one bit to appear in said hidden bit position of said mantissa portion.

16. The number processing system of claim 15 wherein said table look up means of said logic means in said variable stage load path further comprises:

means for adjusting said exponent portion of said denormalized number from all binary zero bits to a biased number representing said count of said shifts required to cause said binary one bit to appear in said hidden bit position of said mantissa portion, said biased number being on a scale wherein 3FF represents a value of zero.

17. Method of loading a floating point pipelined unit comprising the steps of:

detecting whether an operand is in a valid form;

converting said operand to a valid form while delaying execution of an instruction for performing an operation on said operand without stopping said pipelined unit thereby introducing one stage of delay;

presenting said converted operand to said pipelined unit for processing after delaying execution of said instruction for performing said operation on said operand.

18. The method of claim 17 further comprising the steps of:

bypassing said steps of converting and presenting said converted operand to said pipelined unit; and presenting a valid operand to said pipelined unit without introducing said stage of delay.

19. The method of claim 18 further comprising the steps of:

detecting a misaligned operand; and converting said misaligned operand to an aligned operand before presenting said valid operand to said first stage.

20. The method of claim 17 wherein:

said step of detecting, detects a misaligned operand; and said step of converting, converts said misaligned operand to an aligned operand by:

storing a first portion of said misaligned operand while a second portion of said misaligned operand is being obtained from said source of operands; and combining said first portion of said misaligned operand and said second portion of said misaligned operand into aligned position while presenting said converted operand to said pipelined unit for processing.

21. The method of claim 17 further comprising the steps of:

receiving another operand in an invalid form from an operand source while said converted operand is being presented to said pipelined unit;

converting said another operand to a valid form without further delay.

22. The method of claim 21 further comprising the steps of:

receiving still another operand in a valid form from said operand source while said converted another operand is being presented to said pipelined unit;

staging said still another operand while said another operand is being processed by a first stage of said pipelined unit;

presenting said still another operand to said pipelined unit after said another operand has been processed by a first stage of said pipelined unit.

* * * * *